May 17, 1938.   H. S. BUCKINGHAM   2,117,295
METHOD OF AND MEANS FOR MAKING RECEPTACLES
Filed Jan. 24, 1936   7 Sheets-Sheet 6
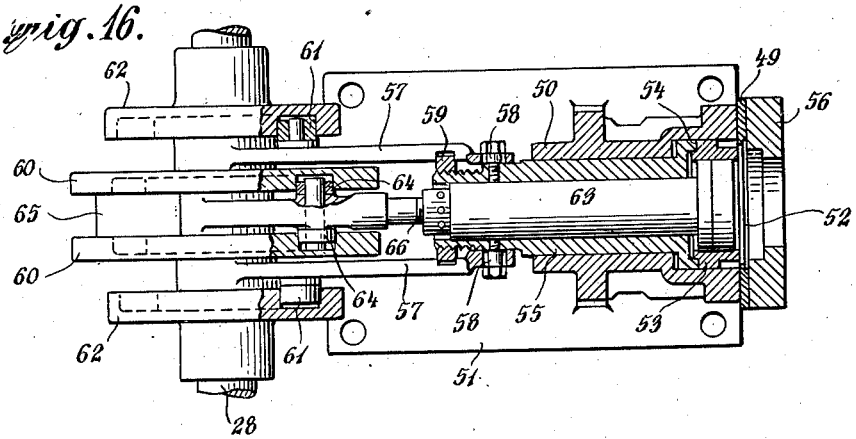
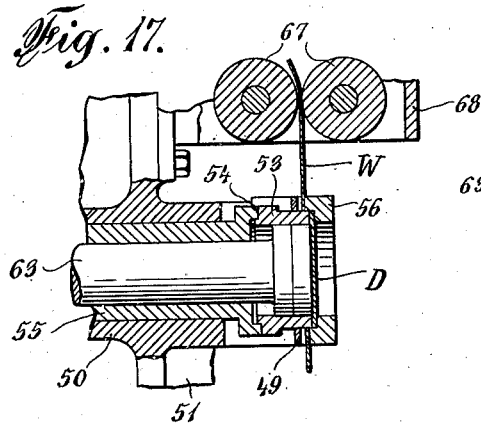
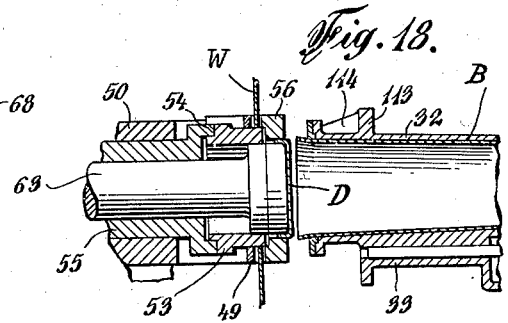
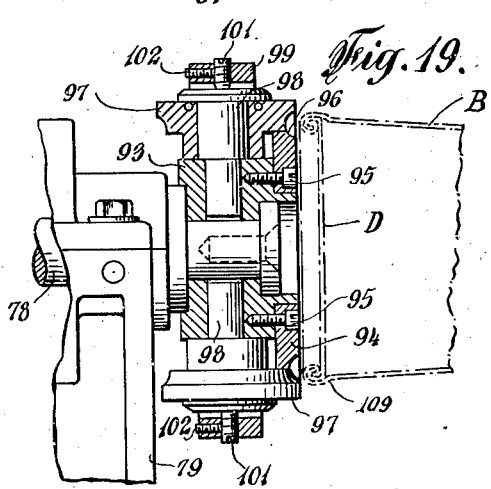
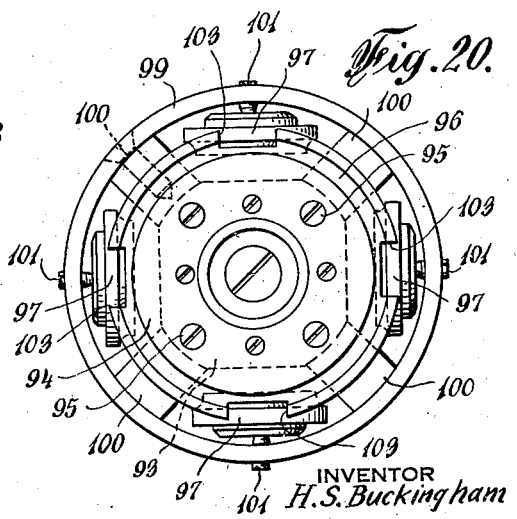
INVENTOR
H. S. Buckingham
BY
ATTORNEY

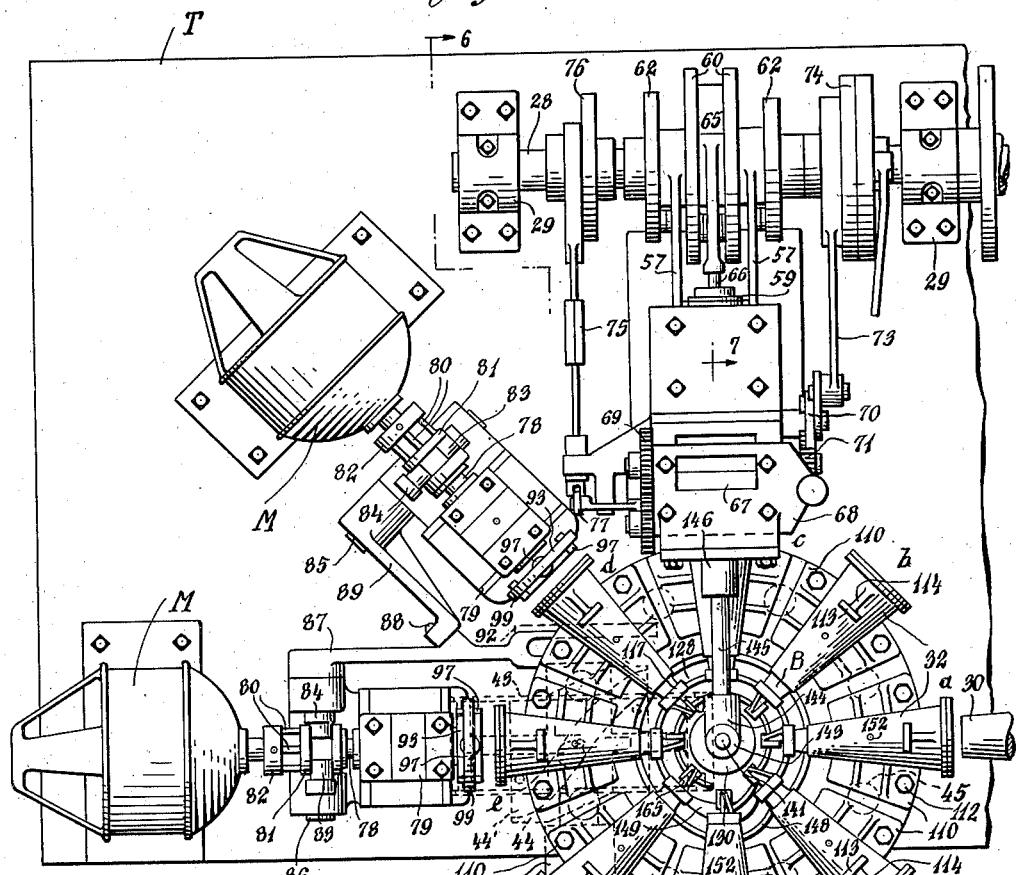

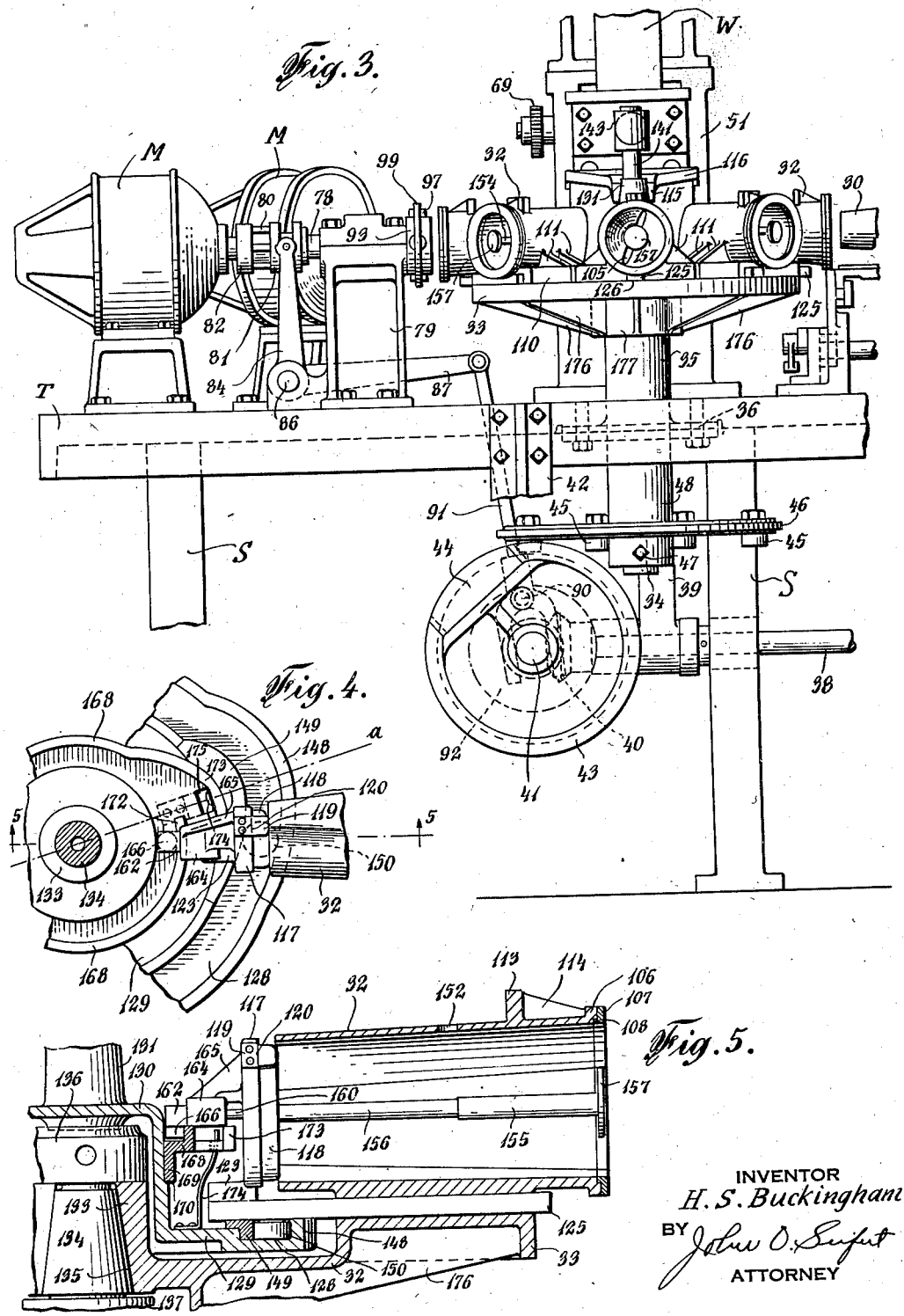

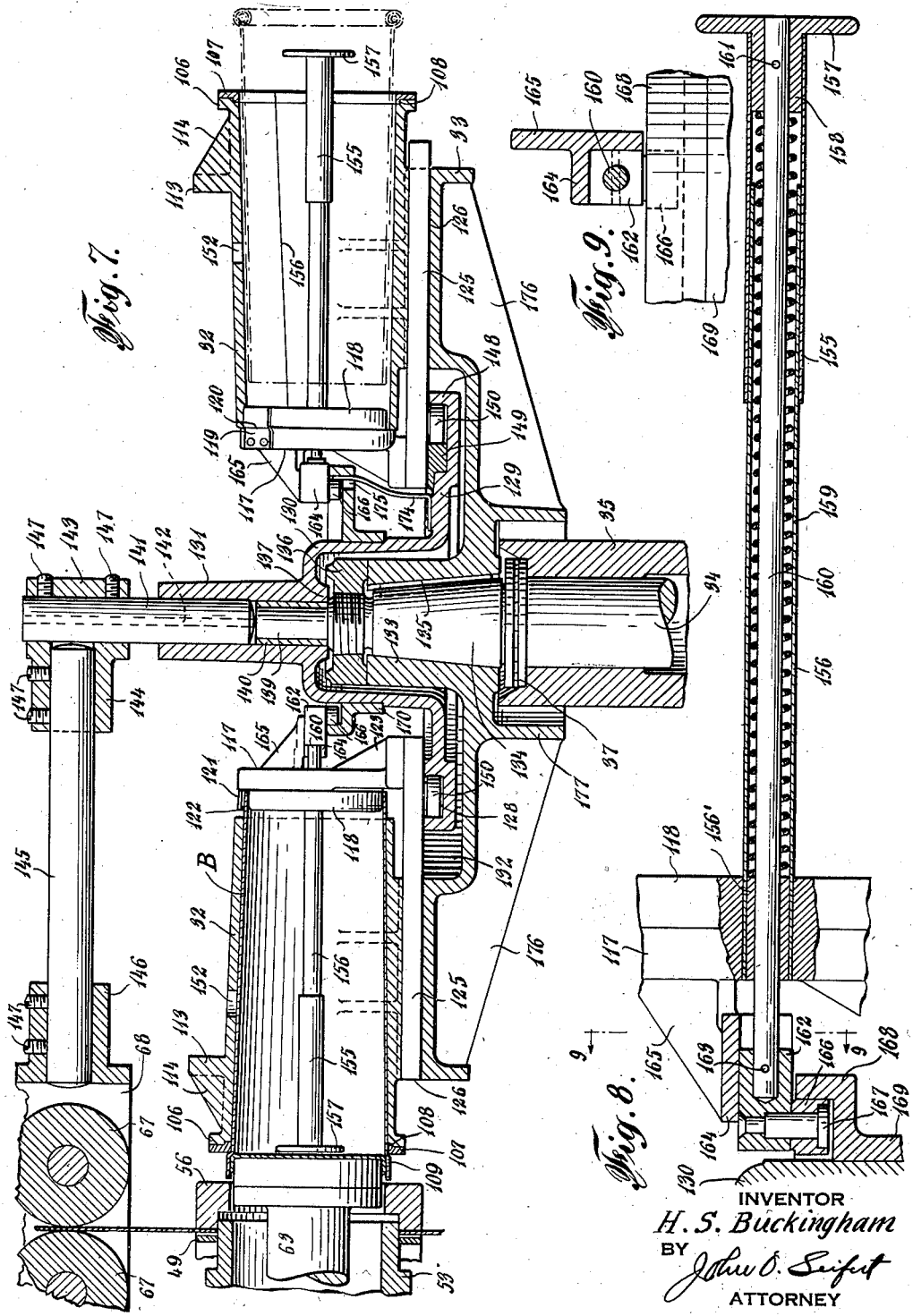

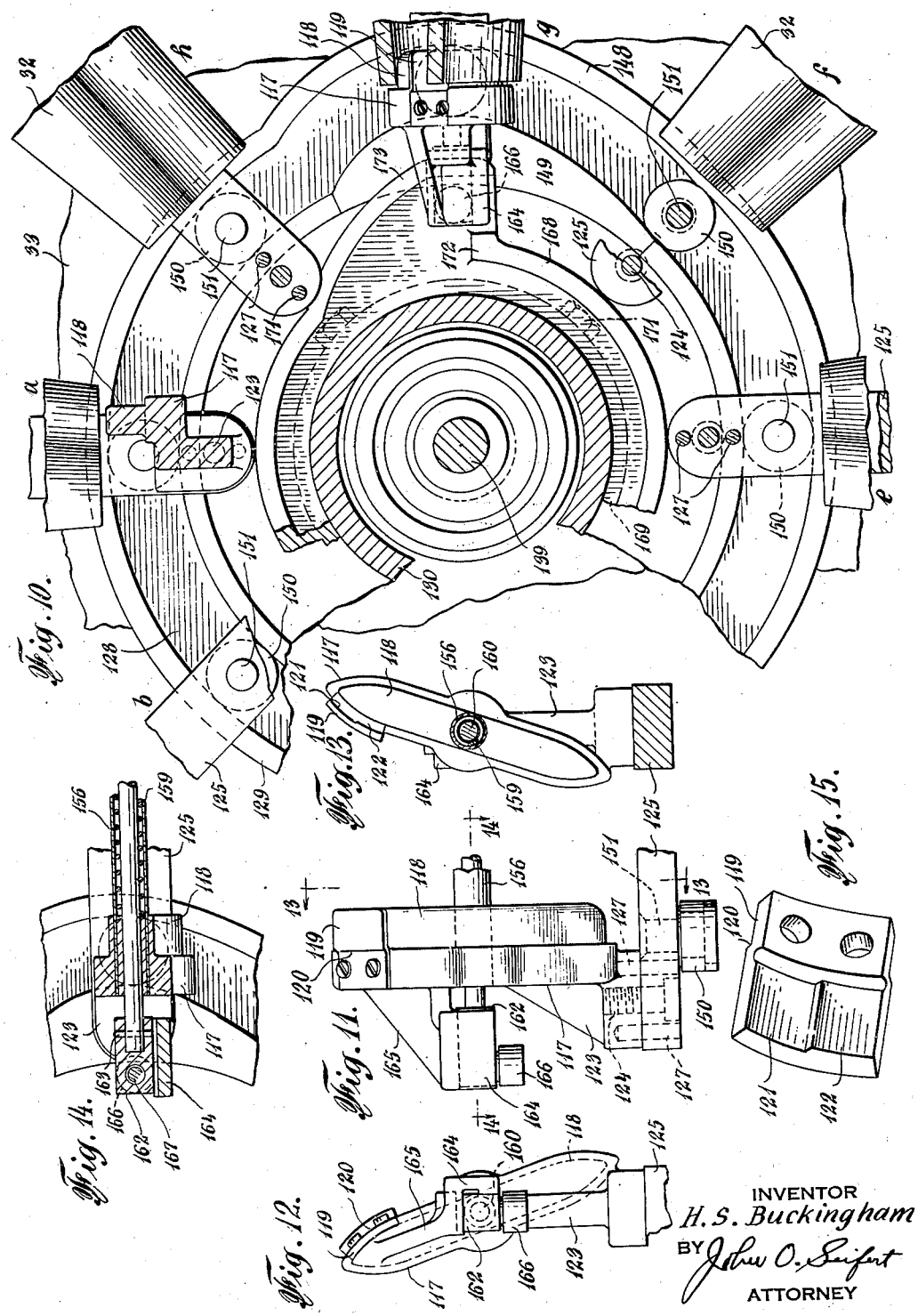

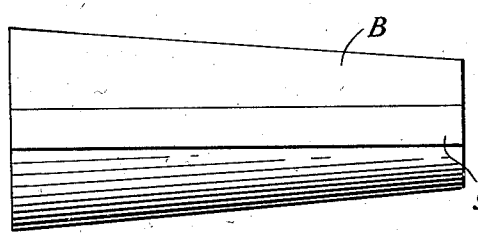
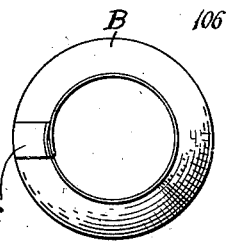
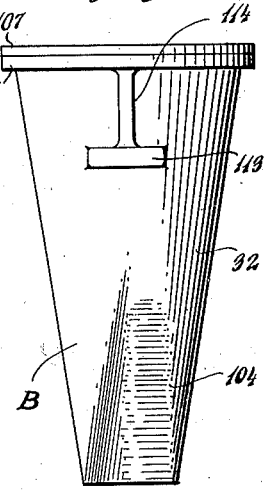
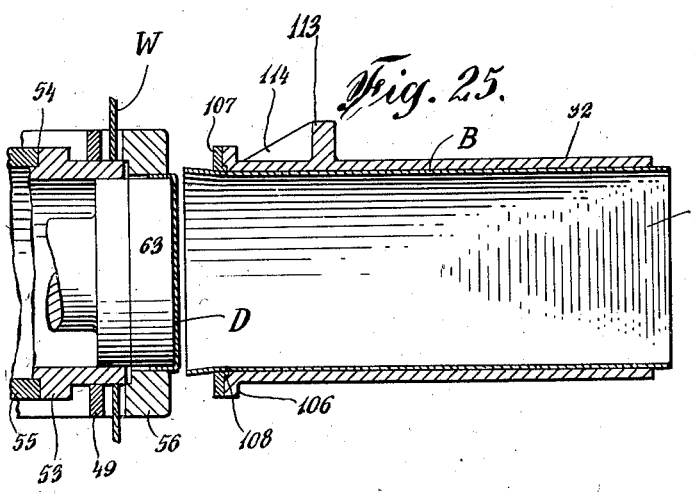
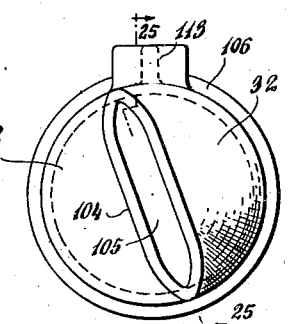
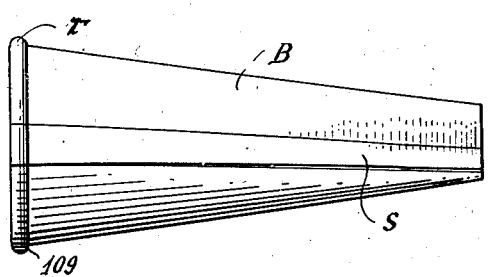
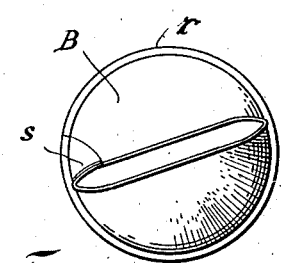

Patented May 17, 1938

2,117,295

UNITED STATES PATENT OFFICE 2,117,295

METHOD OF AND MEANS FOR MAKING RECEPTACLES

Harold S. Buckingham, New York, N. Y., assignor to American Sealcone Corporation, New York, N. Y., a corporation of New York Application January 24, 1936, Serial No. 60,645

42 Claims. (Cl. 93—39.3)

This invention relates to the making of receptacles or containers having a body with a closure secured in one end and the opposite end constituting the filler opening closed by squeezing together opposite wall portions at said end.

It is the principal object of the invention to provide an improved method of making receptacles of this character and improvements in machines for making the receptacles as disclosed in Letters Patent No. 1,916,981, issued July 4, 1933.

In the making of containers by apparatus of said Letters Patent, the body is formed by wrapping a sheet or blank around a mandrel of circular form in cross section and secured at the longitudinal marginal portions by adhesively applying a strip over said marginal portions of the blank and forming a receptacle body of cylindrical form corresponding in shape to the mandrel. The body so formed is delivered from the mandrel to one of a series of holders of cross sectional shape conforming with the shape of the mandrel to hold the receptacle body at the wall in the cylindrical shape to which it was formed on the mandrel, the holders being carried by and equidistantly spaced about an intermittently operative carrier to successively position the holders with receptacle bodies so held therein to means to stamp a disk from a web, peripherally flange the disk and engage the flanged disk in the end of a receptacle body in a holder to serve as a closure therefor, the carrier then being actuated to position the holders relative to means to crimp or roll together the disk flange and contiguous end portion of the receptacle body to secure the flanged disk in the receptacle body and complete the receptacle, when the carrier is actuated to advance the holder with the receptacle to position to eject the receptacle from the holder. The receptacle so formed is then provided with a coating of moistureproof material, such as paraffine, and after the coating has set and hardened the receptacle is filled through the open end and said end is closed by collapsing or squeezing together opposite wall portions at the filler end to substantially a flat condition and secured in closed condition, as by a metallic member engaged over and clamped to the collapsed end portions of the receptacle. In squeezing together the opposite wall portions at the filler end, the opposite wall portions of the body at the collapsed sides are longitudinally displaced and effecting an upward distortion or deflection of the diametrically opposite portions of the bottom or end with the closure secured therein in line with the squeezed together sides of the receptacle, setting up stresses and strains in the receptacle body that tend to open the seam at the receptacle body and closure disk, which stresses and strains are augmented by the weight of the contents of the receptacle. Furthermore, to bring together the opposite wall portions at the filler end to close the same necessitates a considerable distorting of the wall of the receptacle body with the result that there is a tendency of cracking and breaking the protecting coating applied to the receptacle and the exposing of an uncoated portion of the receptacle to the contents of the receptacle with not only a consequent contamination of the contents of the receptacle but absorption of the contents of the receptacle by the material of the container when made of paper and possible leakage of the receptacle. Also, the stresses and strains set up between the body and closure disk of the receptacle when closing the receptacle exerts a separating force on the seam between the receptacle body and closure disk that also tends to crack and break the protective coating at said seam as well as at the side seam.

It is a further object of the invention to overcome the above disadvantages in containers of this character by providing in receptacle making apparatus a holder for the receptacle body of novel construction and arrangement adapted to preform the end of the receptacle body to constitute the filler end of the receptacle to partially closed condition by the insertion of the body in the holder and support the body in such condition during the insertion and securing of the closure disk in the one end of the receptacle body, and produce a receptacle wherein the filler opening is in partial closed condition and the final closing of said opening will not set up stresses and strains that will tend to separate the seams of the receptacle or break the protective coating on the receptacle when the filler opening is closed.

It is another object of the invention to provide an improved construction of receptacle holder having the inner supporting surface for the receptacle body arranged to reduce the frictional contact between the holder and receptacle body to a minimum, whereby a receptacle body having a closure disk therein may be readily ejected from the holder and without injuring the receptacle body.

It is a further object of the invention to provide means mounted on the holder carrier and actuated by the travel of the carrier to position and support a receptacle body in the holder and hold the receptacle body against movement during the engaging and securing of the closure disk in the receptacle body and operative to loosen a receptacle body having a closure disk secured therein from the holder prior to ejecting the receptacle body from the holder to facilitate the ejection of the receptacle body.

A still further object of the invention is to provide mechanically operative means in receptacle making apparatus to positively eject the receptacle body with a closure disk secured therein from a holder.

In the drawings accompanying and forming a part of this application, Figure 1 is a view looking at the top of a receptacle making apparatus embodying the present invention.

Figure 2 is an end view of a receptacle holder looking at the end into which a receptacle body is engaged to show the interior arrangement of the holder.

Figure 3 is a side elevation of the apparatus.

Figure 4 is a fragmentary plan view of cam means for actuating the means to loosen and eject a receptacle from a holder showing a holder positioned relative to said cam means, the parts being shown in the position they assume just prior to the ejecting of the receptacle from the holder.

Figure 5 is a sectional view taken substantially on the line 5—5 of Figure 4 looking in the direction of the arrows.

Figure 6:
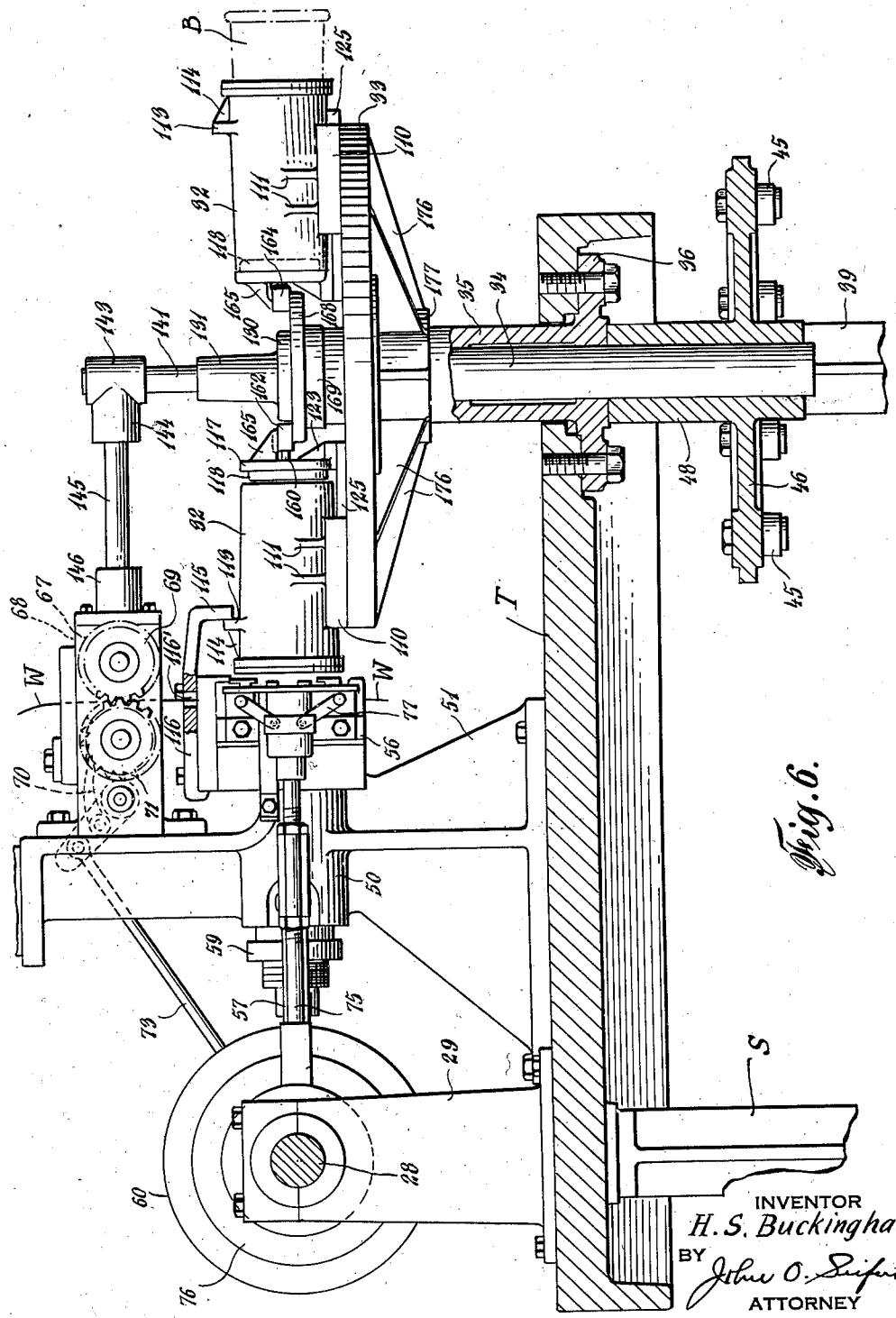
Figure 6 is a sectional view, on an enlarged scale, taken substantially on the line 6—6 of Figure 1 looking in the direction of the arrows and showing the positions of the means to support, loosen and eject a receptacle body relative to holders positioned at the closure disk forming and engaging means and at the receptacle ejecting station.

Figure 7 is a sectional view, on an enlarged scale, taken on the line 7—7 of Figure 1, showing the positioning of a closure disk in a receptacle body in a holder and the ejecting of a receptacle from a holder, and showing the structure and arrangement of the means for supporting the inner end of a receptacle body in the holder during the engaging and securing of a closure disk therein and to loosen a receptacle from the holder preparatory to ejecting the receptacle from the holders, and the means for ejecting the receptacles from the holders.

Figure 8 is a sectional view, on an enlarged scale, of the means for ejecting receptacles from the holders showing the position thereof as a receptacle body is inserted in a holder and a closure disk is engaged and secured in the receptacle body.

Figure 9 is a sectional view taken on the line 9—9 of Figure 8 looking in the direction of the arrows and showing the connection of the ejecting means with a cam rail normally maintaining said ejecting means within the holder.

Figure 10 is a plan view of cam rails for controlling the actuating of the receptacle body supporting and loosening means and the ejecting means.

Figure 11 is an elevational view of the means for supporting and loosening receptacle bodies in the holders.

Figure 12 is a view looking at the left of Figure 11.

Figure 13 is a sectional view taken on the line 13—13 of Figure 11 looking in the direction of the arrows.

Figure 14 is a cross sectional view taken on the line 14—14 of Figure 11 looking in the direction of the arrows.

Figure 15 is a perspective view of a clamping member mounted on the means for supporting and loosening receptacle bodies in the holders and adapted to engage the adhesive strip of the receptacle bodies to guide and properly position the receptacle bodies in the holders.

Figure 16 is a sectional plan view of punch and die mechanism to stamp a closure disk from a web, flange and insert the same in a receptacle body.

Figure 17 is a sectional side elevation of the punch and die mechanism showing the severing of a closure disk from a web.

Figure 18 is a sectional view of the punch and die mechanism showing the manner of flanging a severed closure disk and engaging the flanged disk in a receptacle body.

Figure 19 is a sectional view of a spinning head to fold a portion of the receptacle body inward over the edge of a disk flange and interfold the disk flange with the receptacle body and showing a portion of a receptacle body with an inserted flanged disk in dot and dash lines in relation to said head.

Figure 20 is a front elevation of the spinning head looking at the right of Figure 19.

Figure 21 is a side elevation of a receptacle body after it is ejected from a forming mandrel and in the condition it is engaged in a holder.

Figure 22 is a view looking at the right of Figure 21.

Figure 23 is a view of a receptacle body holder looking at the side thereof.

Figure 24 is an end view of the holder looking at the bottom of Figure 23.

Figure 25 is a sectional view of the holder taken on the line 25—25 of Figure 24 looking in the direction of the arrows and showing the holder positioned relative to the closure forming punch and die mechanism with a receptacle body engaged therein.

Figure 26 is a side view of a completed receptacle in the form in which it is ejected from the holder with a closure disk secured in one end of the body and the opposite end preformed to partially collapsed condition; and Figure 27 is an end view of the completed receptacle looking at the right of Figure 26 and showing the partially collapsed condition of the filler end thereof.

In the embodiment of the invention illustrated in the drawings, the operative mechanism of the apparatus is mounted on a suitable frame comprising standards S supporting a table T, Figure 3, and is actuated from a drive shaft 28 journalled in bearing brackets 29 mounted upon the table T, the shaft being operatively connected to a suitable source of power, such as an electric motor, not shown. Only so much of the supporting frame is shown as is essential to an understanding of the invention.

The mechanism is adapted for use with and constitutes a part of receptacle body forming means wherein blanks of suitable form are fed to and wrapped about a tapering mandrel 30 supported on the table T, only the delivery or tapered end of which is shown, Figures 1 and 3. The blanks are wrapped around the mandrel with the longitudinal marginal portions of the blank overlapped and secured in such position by a strip s of suitable material, such as paper, adhesively applied under pressure to the overlapped portions of the blank, as shown and described in the aforementioned Letters Patent No. 1,916,981.

The blank formed on the mandrel to a tubular or truncated conical shaped receptacle body B of continuous circular form for the entire length thereof, as shown in Figures 21 and 22, is ejected from the mandrel by suitable mechanism, not shown, into one of a series of hollow holders 32 fixedly mounted in equidistant spaced relation to each other on a turret in the form of an annular carrier or table 33 fixed on a shaft 34 rotatably supported in a sleeve 35 extended through an opening in the table T and secured thereto by screws extended through openings in a flange of the sleeve and threaded into the table, as at 36, the shaft being anti-frictionally supported in the sleeve, as by a roller bearing mounted on the shaft and seated in an annular seat in the upper end of the sleeve, as shown at 37 in Figure 7. The table 33 is arranged with a hub 133 adapted to engage on a tapered portion 134 of the shaft 34 extended above the bearing 37 and keyed thereto, as at 135 in Figure 7, the table 33 being retained against longitudinal movement on the shaft 34 by the taper of the portion 134 and a nut 136 threaded onto the shaft 34 in abutting relation to the upper end of the hub 133. The table 33 is reinforced by radial ribs 176 on the under surface of the table and extending from a sleeve portion 177 projecting downward from the table in spaced relation to the sleeve 35.

To successively present an end of the receptacle body holders 32 relative to means to form a closure disk D, engage the disk in the end of a receptacle body in a holder and secure the closure disk in the receptacle body, the annular table 33 is intermittently rotated from a shaft 38 journalled in bearing brackets 39 suspended from the table, the shaft 38 being operatively connected to and driven from the drive shaft 28, as clearly shown in Patent No. 1,916,981. The shaft 38 is operatively connected, as by pinions 40, to a shaft 41 journalled in brackets 42 suspended from the table T and intermittent movement is transmitted from the shaft 41 to the shaft 34 of the table 33 by a drum 43 fixed on the shaft 41 having a block 44 mounted in a peripheral recess thereof with portions extending beyond the opposite ends of the drum and arranged with a sinuous groove 44', as shown in dotted lines in Figure 1, adapted to engage during the continuous rotation of the drum 43 a roller 45 of a series of rollers equidistantly spaced about and mounted on a disk 46 fixed to the end of the shaft 34 extending below the flange of sleeve 35 by a set screw 47 threaded into a hub 48 of said disk and engaging a socket in the shaft with the end of the disk hub abutting the flange of sleeve 35, as clearly shown in Figures 3 and 6. The rollers 45 are equal in number to the holders 32 on the table 33 and spaced midway between the holders, as shown in dotted lines in Figure 1, the length of the drum 43 being equal to the space between adjacent rollers whereby by the continuous rotation of the drum 43 the table is intermittently rotated by the rollers successively engaging the sinuous or cam groove 44' in the block 44 and being moved along said groove from one end to the opposite end of the drum 43 by the rotation of the drum.

A holder 32 having a receptacle body therein is actuated from position or station $a$ in alinement with the mandrel 30 to receive a receptacle body therefrom to station $b$ where no operation is performed on the receptacle body in the holder, and then to station $c$ relative to punch and die mechanism for forming the closure disk D from a web W of relatively stiff material. The punch and die mechanism embodies a plate 49 having an opening therethrough fixed in axial relation to the end of a tubular portion 50 of a standard 51 supported by the table T and having an annular recess 52 in the face opposite said tubular portion to provide a space for the feeding of the web across said plate relative to the opening therein. A tubular punch head 53 is slidably mounted in an enlarged section of the tubular portion 50 and connected, as at 54, to a tubular plunger 55 slidable in the tubular portion 50. A die block 56 having an opening therethrough with two diameters is fixed to the plate 49 with the opening portion of greatest diameter adjacent to said plate. To stamp a closure disk from the web the punch 53 is reciprocated by a pair of arms 57 connected at one end to the opposite sides of the plunger 55 by engaging screws in elongated openings in the offset end portions of the arms and threaded into the plunger, as at 58 in Figure 16, to permit of adjustment of the plunger and arms relative to each other, said arms being also adjustably connected with the plunger by a collar threaded onto the end of the plunger engaging in recesses in the arms, as at 59. The opposite ends of the arms 57 are bifurcated and straddle the hubs of disks 60 fixed on the drive shaft 28 with rollers 61 carried by the arms engaging cam grooves in the faces of disks 62 fixed on the shaft 28 at the outer sides of disks 60. As the closure disk D is stamped from the web W it is successively peripherally flanged (Figures 18 and 25) by a head of a plunger 63 forcing the severed disk through the reduced portion of the opening through the die block 56. The plunger 63 is slidably mounted within the tubular plunger 55 and reciprocated by rollers 64 carried by a yoke member 65 engaging cam grooves in the disks 60, the yoke having an adjustable connection 66 with the plunger 63. Simultaneously with the flanging of the closure disk D it is inserted into the larger end of the receptacle body B in and projecting slightly from the holder 32 at station $c$, the movement of the plunger 63 being of an extent and the disk flange of a length so that the end of the receptacle body will project beyond the disk flange, as shown in Figure 7.

The web W is intermittently fed to and in timed sequence with the operation of the punch and die mechanism by a pair of rollers 67 mounted in a frame 68 fixed to and extending forward from the standard 51 above the die mechanism. The rollers are positively driven one from the other through gearing 69 intermittently rotated by a pawl 70 co-operating with a ratchet wheel 71 rotatable with a roller 67, the pawl 70 being carried at one end of an arm 73 oscillated to impart ratchet wheel feeding movement to the pawl by a cam follower carried by said arm engaging a cam groove in a disk 74 fixed on shaft 28.

To strip the receptacle body and closure disk engaged therein in a holder from the plunger and prevent the withdrawing of the same from the holder during the receding movement of the plunger 63, means are provided for engaging the edges of the receptacle body and the flange of the closure disk engaged on the head of the plunger 63, said means being operated by a cam follower carried by a connector 75 to engage a cam groove in a disk 76 fixed to the drive shaft 28. The connector has a toggle link connection 77 with the means for stripping the receptacle body and closure disk from the plunger 63, and as such means does not constitute a feature of the present invention a detailed description and illustration thereof is not deemed necessary.

After the flanged closure disk has been engaged in a receptacle body in a holder at station c the holder carrier 33 is actuated to advance said holder from station c successively to stations d and e where contiguous portions of the receptacle body and the flange of the closure disk are subjected to the action of spinning heads. The spinning head at station d turns or folds the end of the receptacle body over the closure disk flange, and the spinning head at station e interfolds inwardly the end of the receptacle body and disk flange. The spinning heads are fixed to shafts 78 rotatably and slidably mounted in bearings carried by standards 79 and operatively connected with the shafts of motors M mounted on the table T to rotate with and have axial movement relative to said motor shafts. The connections between the spinning head shafts and the motor shafts comprise pins 80 fixed in a collar 81 and slidably engaging in openings in collars 82 fixed to the motor shafts, the collar 81 being fixed to the shafts 78. The shafts 78 are reciprocated to move the spinning heads into and out of operative relation with the receptacle bodies in holders at stations d and e by rollers 83 engaging in annular recesses in collars 81, said rollers being carried by pins extended inward from the legs of a bifurcation at the end of levers 84 fixed to rock shafts 85, 86 rotatably mounted in the standards 79. The shafts 85, 86 are rocked in synchronism by a lever 87 fixed to shaft 86 and having a universal joint connection 88 with an arm 89 fixed to shaft 85, the lever 87 being actuated from the holder carrier actuating shaft 41 by a roller 90, shown in dotted lines in Figure 3, carried by a link 91 to engage a cam groove in a disk 92 fixed to shaft 41, the link having a pivotal connection at one end with the lever 87 and the opposite end arranged with a bifurcation to straddle the shaft 41. The spinning heads are actuated in timed sequence with the actuation of and during the periods of rest of the holder carrier 33.

Both of the spinning heads are of the same structure (Figures 19 and 20) and illustration and description of one will suffice for both. Each head comprises a block 93 mounted on a reduced end of the shafts 78 with a disk 94 secured upon a reduced portion at the front of the block by screws, as at 95, and said disk having a peripheral recess 96 of arcuate form in cross section. A series of four rollers 97 are rotatably carried upon the enlarged portion of shouldered and headed studs 98 mounted in and spaced equidistantly about the block 93, said studs being retained in position on the block by a ring 99 encircling and secured to the block by headed screws passed through openings in the ring and threaded into projections extending laterally from the block, as at 100. Set screws 101 are threaded into openings in the ring 99 to engage the end of the roller studs 98 and locked in position by set screws 102. The rollers have an annular enlargement and the disk 94 has cut outs through which a peripheral portion of said roller enlargement extends, as at 103, the rollers having a recess of arcuate form to register with the arcuate recess 96 in disk 94 and form therewith a recess of semi-circular form in cross section, which recess, when the one spinning head is brought to the receptacle body B will turn the end of the receptacle body inward over the disk flange, and when the other spinning head is brought to the receptacle folding said turned in portion of the receptacle end with the disk flange inwardly upon themselves and thereby form a rolled disk securing seam r, as shown in Figure 26.

From stations d, e the holders are successively advanced to stations f and g, no operation being effected at station f, but at station g, the receptacle body having a closure disk secured therein is ejected from the holder.

In carrying out the embodiment of the invention to preform the circular filler end of the receptacle bodies to flattened wedge shaped condition with an elongated filler opening prior to the engaging and securing of the closure disk in the opposite end of the receptacle bodies and maintain the filler end in such preformed condition while the closure disks are being engaged and secured in the receptacle bodies, the holders 32 are of truncated conical form with opposite wall portions commencing intermediate the opposite ends of the holders progressively flattened toward the end of smaller diameter and obliquely to a vertical line transversely of the axis of the holders, as at 104, whereby said end of smaller diameter of the holders is of wedge shape with the opening of elongated form, as at 105 in Figure 24, and of a length equal to the end of larger diameter of the holder, as clearly shown in Figure 25. The end of larger diameter of the holder is of circular form and has a diameter at the extremity slightly less than the diameter of the head of plunger 63 and disk flange thereon. The length of the holders is such that when the receptacle bodies are fully engaged therein the opposite end portions of the receptacle bodies will project from the opposite ends of the holders, the end portion of the receptacle bodies projecting from the larger end of the holders for the purpose of permitting the forming of the closure disk securing seam r by the spinning heads 93. The larger ends of the holders are reinforced to prevent distortion and wear of said end by the operation of the plunger 63 in engaging the closure disks in the receptacle bodies and the actuation of the spinning heads by arranging said ends with a laterally extending flange 106 and securing thereto an annular member 107 of wear resisting material having an annular shoulder on a face thereof adjacent the inner periphery to engage a corresponding recess in the end of the holder, as at 108 in Figures 5, 7 and 25, to facilitate the mounting of said annular member on the flanged end of the holders. The diameter of the plunger head and blank of the disk thereon is equal to the mean diameter of the projecting end portion of the receptacle body and as the disk on the plunger head is engaged in the projecting end of the receptacle body in a holder by the plunger 63 the portion of the receptacle body projecting from the holder will be offset longitudinally and laterally over the member 107 forming a shoulder, as shown at 109 in Figure 7, and shaping the projecting portion of the receptacle body to cylindrical form and uniform diameter, the closure disk being seated against said shoulder and assuring a liquid tight joint between the receptacle body and closure disk when the closure disk is secured in the receptacle body.

The holders are fixedly mounted on the annular table 33 by base portions 110 extended laterally of and tangentially of a peripheral portion of the holders with reinforcing ribs 111 integral with and extending between the base portions and the body portion of the holders. The base portions 110 engage the upper surface of the table 33 and are secured thereto by bolts 112. The base portions 110 are arranged so that the holders will be mounted on the table 33 with the elongated opening 105 extending in an oblique direction to the vertical, as shown in Figure 2, and the large circular end portions of the holders will project beyond the periphery of the table to an extent to properly position the larger end of the receptacle body projecting from a holder relative to the die block 56 and spinning heads 93.

To take up the force of the thrust of the plunger 63 on the holders in engaging the flanged closure disks D in the receptacle bodies in holders and prevent loosening the mounting of the holders on the annular table and breaking of the same, each holder is arranged with a lug 113 integral with and extending upwardly from the upper peripheral portion of the holders and spaced from the flanged ends of the holders with an intervening reinforcing rib 114 adapted to engage a downwardly extending flange 115 of a plate 116 fixed on the support for the punch and die mechanism and having an opening 116' therein for the passage of the web W, as shown in Figure 6.

To limit the insertion of the receptacle bodies into the holders and hold the receptacle bodies against longitudinal movement toward the flattened ends 104 of the holders during the engaging and securing of the closure disks in the receptacle bodies at stations c, d and e, a movable abutment is mounted relative to and adapted to engage in the flattened end of the receptacle bodies projecting from the flattened inner end of the holders, said abutment comprising blocks 117 of elliptical shape in cross section corresponding to the opening 105 in the holders and having a projecting reduced face portion 118 adapted to be engaged in the end of the receptacle bodies abutting the body of the abutment blocks about said reduced portion, as clearly shown in Figure 7, the end of the receptacle bodies being engaged onto the abutment when they are engaged in the holders at station a. The abutments maintain the receptacle bodies in proper position in the holders and also take up lateral stresses and strains imparted thereto by the spinning heads 93, and to prevent separation of the side seam by said stresses and strains means is arranged on each block 117 to engage over the end portion of and with the longitudinal securing strip s of the receptacle bodies, said means being in the form of a plate 119 of arcuate shape in cross section to correspond with the curvature of the blocks adjacent the end thereof and secured at one end to the body of the blocks with the opposite end portion of the plate offset outward, as at 120, and extended over in spaced relation to the side face of the reduced portion 118, the face of said end portion opposed to the portion 118 being arranged with stepped portions 121, 122 to conform to and engage over the side sealing strip s and the overlapped longitudinal marginal portions of the receptacle body, the space between the extended end portion of the plate 119 and the side face of the reduced portion 118 being sufficient to permit engagement of the receptacle body therebetween, but will prevent lateral movement of the receptacle body in the holder, as clearly shown in Figures 11, 12, 13 and 15. The end of the holders is provided with a recess to receive the plate 119.

The abutments 117 are slidably mounted on the table 33 in axial alinement with and to have movement toward and away from the holders 32. For this purpose the blocks 117 are provided with a base portion 123 integral with and at the end portion of the blocks opposite to the portion arranged with the plates 119, and whereby the blocks are releasably connected by a screw 124 to slide bars 125 longitudinally reciprocal in slideways 126 in the bottom of the base portion 110 of the holders in alinement with the axis of the holders, as clearly shown in Figures 2 and 11 to 14. The base portion 123 extends from the blocks 117 at an angle to properly position the blocks to extend obliquely to the vertical and in register with the elongated openings 105 at the inner end of the holders. To facilitate alining the base portion 123 of the blocks 117 on the slide bars 125, said base portions and the slide bars are arranged with alined openings for the engagement of pins, as shown at 127 in Figure 11.

In accordance with the structure and mounting of the abutment blocks 117 as described it will be understood that the abutment blocks travel with the table 33, and at the stations a, b, c, d, e, f and h the abutment blocks are positioned in spaced relation to the flattened ends 104 of the receptacle body holders 32 to engage the inner end of receptacles in the holders, effected by rollers 150 carried by the bars 125 engaging in and following a groove or channel 128 in the face of a disk 129 having an axial laterally extending hood portion 130 with a hub 131 extended therefrom. The cam disk 129 is fixedly mounted axially of shaft 34 to engage in an annular recessed portion 132 of the table 33 with the upper face substantially in the plane of the upper face of the table to permit reciprocation of the slide bars 125, as clearly shown in Figure 7, by engaging the hub 131 on the reduced end 139 of the shaft 34 with an interposed bushing 140 and the end of the hub engaging a shoulder 137 on the shaft formed by reducing the end of the shaft and the hood 130 engaging about the hub 133 of the table 33. The cam disk 129 is held against rotation with the table 33 by a stub shaft 141 engaged at one end in the disk hub 131 above the reduced end 139 of shaft 34 and keyed thereto by a key 142. The opposite end of the shaft 141 is fixed in the head 143 of a T-member 144 on one end of a bar 145 fixed at the opposite end in a boss 146 extended laterally from the supporting frame 68 for the feeding rollers 67 for the web W. The shaft 141 and the bar 145 are fixed in the T-member 144 and the bar in the boss 146 by set screws, as shown at 147 in Figure 7. The bar 145 will also take up stresses and strains that may be transmitted to the shaft 34 by the plunger 63 in engaging flanged closure disks D in receptacle bodies in holders. The key 141 is also extended into a keyway in the head of the T-member to hold the stub shaft against rotation.

The portion of the groove 128 in disk 129 at station g is arranged with a cam portion formed by extending outward the outer wall thereof in an arcuate path eccentric to the axis of the disk, as at 148 in Figure 10, and correspondingly forming the inner wall of the channel, and shown as effected by inserting an eccentric wall portion in the inner wall of the channel, as at 149 in Figure 7, corresponding to the curvature of the eccentric portion 148 to form a continuous channel of even width. As the slide rollers 150, mounted on a shouldered stud 151 fixed in each of the slide bars, travel relative to the concentric portion of the channel 128 the abutment blocks 117 are positioned in spaced relation to the flattened inner end of the holders, as shown by the holder at the left in Figures 6 and 7, and as the holders are actuated from station f to station g the rollers travel relative to the cam portions 148, 149 and the abutment blocks actuated toward the holders engage the reduced face portions thereof into the holders, the rollers being positioned relative to the apex of the cam portions when the holder carrying turret comes to rest, as shown by the holder at the right in Figures 6 and 7. This movement of the abutment blocks toward the holders will engage the blocks with and move the receptacle bodies with closure disks secured therein outward from the holders toward the larger circular ends thereof and release the walls of the receptacle bodies from contact with the walls of the holders and facilitate a ready ejection of the receptacle bodies from the holders at station g. During the actuation of the holders from station g to station h, the rollers will travel from the apex of the cam portions 148, 149 to the concentric portion of the channel 128 and position the abutment blocks 117 in spaced relation to the flattened inner ends of the holders to permit the engagement of receptacle bodies in the holders at station a and properly position the receptacle bodies in the holders.

The engaging of the receptacle bodies in and the ejection of the receptacles from the holders is further facilitated by reducing the amount of surface contact between the receptacle bodies and holders effected by arranging the interior surface of each holder with a series of recesses or grooves 153 extending longitudinally of the holder, certain of the recesses being arranged in opposed relation to each other, and one of the recesses or grooves commencing at the circular larger end of the holders substantially vertically above the axis of the holders and terminating at the upper end of a side of the elongated opening 105, as shown at 154 in Figure 2, for the engagement of the side sealing strip s of the receptacle body.

To eject the receptacles from the holders at station g, mechanically operated ejectors are provided, each comprising a pair of tubular telescoping members 155, 156, the member 156 being fixed at one end in each of the abutment blocks 117 and extended therefrom axially into the holders, and the member 155 slidably mounted on the outer end portion of the member 156 and mounted at the outer end on a shank 158 of a head 157, as shown in Figure 8, and yieldingly urged in a direction outwardly through the large end of the holders by a coiled spring 159 in each pair of the tubular members 155, 156 compressed between a bushing 156' in the end of tube 156 at which it is mounted in the blocks 117 and the head shanks 158, the spring having sufficient force to eject the receptacles from the holders. The ejector heads 157 are carried by and normally positioned within the holders when the holders are moved relative to stations a to h, inclusive, by a rod or plunger 160 slidably carried within each of the tubes 156 and extending centrally through the coiled springs and fixed at one end in the heads 157 by a pin 161. The opposite end of the rods extends through the bushing 156' rearwardly of the blocks 117 and fixed in a block 162 by a pin 163, the block 162 slidably engaging a slideway 164 in an angular portion of an arm 165 integral with and extending from the rear of the blocks 117, as clearly shown in Figures 8, 9, 11, 12 and 14. Each of the slide blocks 162 carries a roller 166 mounted on a headed stud 167 fixed in the blocks, the rollers being adapted to engage and follow a vertical wall portion 168 of an annular member 169 mounted on a reduced portion of the hollow portion 130 of the disk 129 and engaging the shoulder formed by said reduced portion, as at 170, and secured on the part 130 by bolts 171, shown in dotted lines in Figure 10. The wall portion 168 terminates at one side of and a point in the travel of the holders just prior to the positioning of the holders at station g, as shown at 172 in Figure 10, and in radial spaced relation to an outwardly projecting arcuate cam portion 173 of said wall 168 extending outward in an arcuate direction from the opposite end or terminal of said wall from adjacent the station h position of the holders. Just prior to the holders coming to rest at station g, the rollers 166 will ride off of the end 172 of the wall 168 and the ejectors are moved under the tension of the springs 159 outward from the holders causing the ejector heads 157 to engage the closure disk D secured in the receptacle body B with a force sufficient to move the receptacle out of the holder 32. The engagement of the rollers with the arcuate wall portion 173 limits the ejecting movement of the ejector heads, as shown in Figures 7 and 10. To prevent injury to the rollers and the arcuate cam portion 173 and absorb the shock of the rollers engaging said rail portion, a resilient abutment is provided for engagement of the rollers 166, and shown in the form of a leaf spring 174 fixed at one end to the disk 129 with the opposite end extended upwardly through an opening 175 in the annular member 170 and positioned under the tension thereof in spaced relation to the arcuate wall portion 173 and in the path of movement of the rollers 166 as they ride off from the end 172 of wall 168 to the cam portion 173, as indicated by the dot and dash line a—a in Figure 4.

The receptacle body B formed on the mandrel 30 and prior to inserting the same in a holder 32 is of circular form in cross section throughout, as shown in Figures 20 and 21. As the body is inserted into a holder, in the present instance with the open end of smaller diameter foremost, it is preformed by pressing together opposite wall portions at the smaller end and thus shaping the body to tapering or substantially wedge shape from the end of larger diameter to the end of smaller diameter so that said latter opening is elongated and reduced in width, as shown in Figures 26 and 27. This preforming of the receptacle body effects displacement of the opposite pressed together wall portions in a direction longitudinally of the body toward the end of smaller diameter, and while supporting the receptacle body by contact of the wall thereof with the holder a closure disk D is engaged and secured in the end of larger diameter. By so forming the receptacle the end with the closure disk therein will extend in a flat plane at a right angle to the axis of the receptacle, and as the open end of the receptacle is completely closed by pressing together the opposite wall portions into intimate contact there will be no longitudinal displacement of the wall portions of the body of the receptacle that would result in exerting a force on and upward distorting of the closure disk that may tend to open the seam between the closure disk and body with a consequent leakage of the receptacle.

While there is illustrated one embodiment of means for carrying out the method of making receptacles in accordance with the present invention, it will be obvious that various modifications may be made in the construction and arrangement of parts without departing from the scope of the invention.

Having thus described my invention, I claim:

1. The method of making receptacles, which comprises providing a tubular body, positioning opposite wall portions at one end of the body toward each other to provide an elongated opening at said end, and while holding the body exteriorly thereof in said condition securing a closure disk in the opposite end of the body.

2. The method of making receptacles, which comprises providing a tubular body of circular form in cross section, positioning opposite wall portions at one end of the body toward each other to provide an opening of decreased width at said end of the body and maintaining the opposite end in circular form, and in said condition of the body securing a closure disk in the end of the body of circular form.

3. The method of making receptacles, which comprises providing a blank, shaping the blank to tubular form and securing the blank at the longitudinal marginal portions thereof positioning opposite wall portions at one end of the body toward each other to restrict the opening at said end of the body with the secured longitudinal marginal portions positioned at and extending from an end of said opening, and securing a closure disk in the opposite end of the body while holding the body with the one end in restricted condition.

4. The method of making receptacles, which comprises providing a tubular body and a flanged disk, restricting the opening at one end of the body and while holding the body with said end in restricted condition engaging the disk in the opposite end of the body with the flanged disk flange extending outwardly and in contiguous relation to the wall of the body, and then interfolding the disk flange and contiguous wall portion of the body to secure the disk in the body.

5. The method of making receptacles, consisting in providing a truncated conical body, positioning opposite wall portions at the end of smaller diameter of the body toward each other to elongate and transversely restrict the opening in said end of the body, and securing a closure disk in the end of larger diameter of the body while holding the body exteriorly thereof with the end of smaller diameter of the body in its elongated and transversely restricted open condition.

6. The method of making receptacles, consisting in providing a tubular body of truncated conical form, positioning opposite wall portions at the end of smaller diameter of the body toward each other to restrict and elongate said opening substantially equal to the greatest diameter of the body, and while holding the body exteriorly thereof in said condition securing a closure disk in the end of larger diameter of the body.

7. In the manufacture of receptacles having a bottom closure and the opposite end closed by pressing together opposite wall portions at said end, comprising providing a cylindrical member to constitute the receptacle body, preforming said member to converge opposite wall portions from within a circular end toward the opposite end and shaping the opening at said latter end to elliptical form, and then while holding the body in its preformed condition by a longitudinal movement engaging a bottom closure disk in the circular end of the body, and then securing said disk in the body.

8. In the manufacture of receptacles including a body having a bottom closure in one end and the opposite end adapted to be closed by pressing together opposite wall portions at said end, comprising providing a cylindrical member to constitute the receptacle body, and a holder having a bore of circular form at one end with opposite wall portions thereof converging from within said circular end to the opposite end and the opening at the latter end shaped to elliptical form preforming the receptacle body to conform to the shape of the bore of the holder by longitudinally engaging the body into the holder and supporting the body in its preformed condition in the holder with a portion of the circular end projecting from the circular end of the holder, and while supporting the body in the holder securing a closure disk in the portion of the body projecting from the circular end of the holder.

9. In the manufacture of receptacles including a body having a tapering wall and a bottom closure in the end of larger diameter and the opposite end adapted to be closed by pressing together opposite wall portions at said end, which comprises providing a cylindrical member of truncated conical form to constitute the receptacle body, and a holder having a bore of circular form at one end and of elliptical form at the opposite end with opposite wall portions of the bore converging from within the circular end of the bore to the elliptical end thereof, preforming the body to conform to the shape of the holder bore by engaging the truncated conical member longitudinally with the smaller end foremost into the holder, and while holding the body in its preformed shape in the holder engaging a bottom closure disk in the circular end of larger diameter of the body in the holder, and securing said closure disk in the body.

10. In the manufacture of receptacles including a body having a tapering wall and a bottom closure in the end of larger diameter and the opposite end adapted to be closed by pressing together opposite wall portions at said end, which comprises providing a cylindrical member of truncated conical form to constitute the receptacle body, and a holder having a bore of circular form at one end and of elliptical form at the opposite end with opposite wall portions of the bore converging from within the circular end of the bore to the elliptical end thereof, preforming the body to conform to the shape of the holder bore by engaging the truncated conical member longitudinally with the smaller end foremost into the holder with a portion of the end of larger diameter circular projecting from the holder, engaging into the projecting end of the body in the holder a flanged bottom disk having a diameter equal to the mean diameter of said projecting end of the body and offsetting said projecting portion laterally of the end of the holder and arranging the same of uniform diameter, and then interlocking the projecting end of the body with the disk flange to secure the disk in the body.

11. In means for forming and bottoming receptacle bodies of pliable material and truncated conical form, a hollow holder having a bore of circular form at one end and of elliptical form at the opposite end of a length substantially equal to the diameter of the circular end with opposite wall portions of said bore converging from within the circular end to the elliptical end of the holder and adapted to receive a conical receptable body engaged longitudinally into the circular end of the holder bore with the end of smaller diameter foremost and thereby shaping the body to conform to the shape of the holder bore, the holder being of a length and arranged whereby when the body is engaged therein the end of larger diameter will project from the circular end of the holder, a plunger reciprocated toward and away from the circular end of the holder bore having a diameter to engage in the end of a body projecting from the holder, and said plunger being adapted to carry a flanged disk and insert the disk longitudinally into the end of the body projecting from the holder and longitudinally displace and laterally offset the projecting end of the body over the end of the holder and arrange the body with an annular shoulder and seat the flanged disk against said shoulder, and means adapted to interlock the projecting end of the body with the disk flange therein in the holder to secure the disk in the body seated against the annular shoulder.

12. In means for making receptacles, a holder to preform a receptacle body and support said body during the securing of a closure member in an end thereof, comprising a tubular member having a bore of circular shape at one end and opposite wall portions converging toward and formed to elliptical shape at the opposite end and adapted to preform a tubular receptacle body to correspond to the shape of the holder bore by engaging the body in the holder.

13. In apparatus for making receptacles, a holder for preforming a conical receptacle body and support said body during the securing of a closure member in an end thereof, comprising a shell having a bore of circular shape at one end and opposite wall portions of the bore converging from said end toward and flattened at the opposite end and arranging the opening at said latter end of elongated and transversely restricted form.

14. Apparatus for making receptacles as claimed in claim 13, wherein the flattened opposite wall portions of and the elongated opening extend in an oblique direction relative to the transverse horizontal axis of the holder.

15. Apparatus for making receptacles as claimed in claim 12, wherein the holder is of less length than the length of the receptacle body and adapted to support the receptacle body at the wall thereof with portions of the receptacle body extending from opposite ends of the holder.

16. Apparatus for making receptacles as claimed in claim 13, wherein the bore wall of the shell is arranged with a series of grooves extending from one end to the opposite end to reduce the surface thereof contacting with a receptacle body supported in the shell and facilitate the removal of a receptacle body from the shell.

17. Apparatus for making receptacles as claimed in claim 13, wherein the bore wall of the shell is arranged with grooves to reduce the surface area thereof contacting with the receptacle body supported in the shell, said grooves extending longitudinally of and through the ends of the shell and one groove terminating in a flattened wall portion at the juncture thereof with the other flattened wall portion.

18. In apparatus for making receptacles, a holder for a receptacle body adapted to receive a tubular receptacle body inserted into one end thereof, a carrier for the holder intermittently operative to successively position an end of the body in the holder relative to means to engage a closure disk in said end of a receptacle body in the holder and to means to secure the closure disk in the receptacle body, and means mounted on the carrier at the end of the holder opposite the end into which the receptacle body is inserted and having movement toward and away from the end of the holder and normally positioned exteriorly of and in spaced relation to the end of the holder to be engaged by the end of and support the receptacle body in the holder and actuated by the rotation of the carrier successively to the positioning of the holder relative to the means to secure the closure disk in the receptacle body to move the receptacle body longitudinally outward from the end of the holder into which the body was inserted.

19. In apparatus for making receptacles, a table rotatable in a horizontal plane, means to intermittently rotate the table, a holder for a receptacle body mounted on the table to extend radially thereof and into which a receptacle body is adapted to be engaged through the outer end and supported at the wall in the holder, a member mounted on the table in spaced relation to the inner end and axially of the holder to have movement radially of the carrier toward and away from the holder, and means co-operating with said member by the rotation of the table to normally position said member in spaced relation to the end of the holder to engage in the inner end of and limit the movement of the receptacle body into the holder, and actuate said member toward the holder and move the receptacle body longitudinally outward from the holder at a predetermined point in the rotation of the table.

20. Apparatus for making receptacles as claimed in claim 19, wherein the means to position the member to engage and limit the movement of the receptacle body into the holder and actuate said member to move the body outward from the holder comprises a fixed cam rail, and means carried by said member to follow said cam rail by the rotation thereof with the table.

21. Apparatus for making receptacles as claimed in claim 19, wherein the member to engage and limit the movement of the receptacle body into the holder is arranged with a face portion corresponding to the shape of the adjacent end of the holder to engage in the end of the receptacle body in the holder.

22. Apparatus for making receptacles as claimed in claim 19, wherein the wall of the holder converges from within the outer end to the inner end and the inner end is shaped to elliptical form, and the member at the inner end to engage the receptacle body arranged to correspond to the shape of said elliptical end of the holder.

23. In apparatus for bottoming tubular receptacle bodies having a longitudinal side securing seam, a holder for and of a length less than the receptacle body to which the bottom is to be applied and support the body with opposite ends extending from the holder, an intermittently operative carrier on which the holder is mounted to extend radially thereof and adapted to position the outer end of the holder relative to means to engage a receptacle body into one end of the holder, to means to insert a closure disk in the outer end of the receptacle body in the holder, and to means to secure the closure disk in the receptacle body, a member supported by the carrier at the inner end of the holder having a face arranged to engage the end of and limit the movement of the receptacle body into the holder and hold the receptacle body against lateral shifting movement in the holder during the securing of the bottom closure disk in the receptacle body, and means operative by the rotation of the carrier to position said member in spaced relation to the inner end of the holder to be engaged by the body in the holder and retain it in said position during the engagement and securing of the closure disk in the body and then impart movement thereto toward the holder and move the receptacle outward from the holder.

24. Apparatus for bottoming tubular receptacle bodies as claimed in claim 23, wherein the receptacle body has a side securing seam and the member to engage and limit the movement of the body into the holder, comprises a block having a face portion corresponding to the shape of the adjacent end of the receptacle body to engage in and support said end of the receptacle body, and a plate mounted on and spaced from the side of the face portion of the block arranged to engage over the end of the side securing seam of the receptacle body.

25. In receptacle making apparatus, a hollow holder for a receptacle body, a carrier for the holder, means to intermittently actuate the carrier to successively position one end of the holder relative to means to engage and secure a bottom closure disk in the end of a receptacle body in said holder, means to eject the bottomed receptacle body from the holder including a plunger slidably supported in the holder and a spring yieldingly urging the plunger in a direction toward the end of the holder positioned relative to the means to engage and secure the closure disk in the receptacle body, a cam rail fixedly mounted relative to the travel of the carrier, and means carried by the plunger of the ejecting means to follow said rail by the travel of the carrier and position the plunger within the holder against the force of the spring during the period of engaging and securing the closure disk in the receptacle body and successively therewith permit the spring to actuate the plunger into engagement with the closure disk secured in the receptacle body and eject the bottomed receptacle from the holder.

26. In receptacle making apparatus, a rotatable table, means to intermittently rotate the table, a hollow holder mounted on the table to extend radially thereof and adapted to support a receptacle body therein with an end of the body projecting from the outer end of the holder, means disposed about the table to engage and secure a closure disk in the projecting end of the body in the holder, a cam rail extending relative to the travel of and spaced from the inner end of the holder, an ejector plunger slidably mounted within the holder with an end portion thereof extended from the inner end of the holder and yieldingly urged in a direction toward the outer end of the holder, and means carried at the extended inner end of the plunger to follow the cam rail and the cam rail being arranged to position and retain the ejector plunger under the tension of the yielding means in position with the outer end within the holder and at a predetermined point in the travel of the table adapted to ride off said rail and permit the ejector plunger to engage the closure disk of the receptacle body under tension of the yielding means and eject the receptacle from the holder.

27. In receptacle making apparatus, a rotatable table carrying a radially extending hollow holder for a receptacle body, means to intermittently rotate and position the holder relative to stations to engage a receptacle body in the holder, engage and secure a closure disk in the receptacle body in the holder and eject the bottomed receptacle body from the holder, means to eject the bottomed receptacle body from the holder comprising a rod supported to have longitudinal movement in the holder, a rail extending concentric of the axis of the table relative to the stations to engage a receptacle body in the holder and engage and secure the bottom closure disk in the receptacle body and having one terminal spaced from the other terminal radially of and arranged eccentric to the axis of the table at the ejecting station, a follower carried by the rod to follow the rail, and resilient means yieldingly urging the rod in a direction outward of the holder and the follower into engagement with the rail, and said rail adapted to position the rod against the force of the resilient means within the holder and as the follower rides off from the one terminal onto the other terminal of the rail move the ejector rod outward from the holder into engagement with the bottom closure disk secured in the receptacle body and eject the receptacle from the holder.

28. Apparatus for making receptacles as claimed in claim 27, wherein the ejector rod and resilient means are enclosed in telescoping tubular members, one of which tubular members is fixed and the other tubular member connected to the rod to participate in the movement thereof.

29. Apparatus for making receptacles as claimed in claim 27, wherein the resilient means comprises a spring coiled about the rod and confined between the support for the rod and a head on the rod, and telescoping tubular members enclosing the spring and rod, one of said members being fixed on the rod support and the other member connected to the head and participating in the movement of the rod.

30. In receptacle making apparatus, a rotatable table carrying a radially extending hollow holder for a receptacle body, means to intermittently rotate the table and position the holder relative to stations to engage a receptacle body in the holder, engage and secure a closure disk in the receptacle body in the holder and eject the bottomed receptacle body from the holder, means to eject the bottomed receptacle body from the holder comprising a rod supported at the inner end of the holder to extend into and have movement longitudinally of the holder and extended from the inner end of the holder, a rail at the inner end of the holder extending concentric of the axis of the table relative to the stations to engage a receptacle body in the holder and engage and secure a bottom closure disk in the receptacle body with one terminal of the rail spaced from the other terminal thereof radially of and arranged eccentric to the axis of the table at the ejecting station, a follower carried at the inner end of the rod to follow said rail, a head at the outer end of the rod, a spring coiled about the rod and confined between the rod support and head operative to maintain the follower in engagement with the rail and normally position the head within the holder and operative to impart outward movement to the rod to engage the head thereof with the bottom secured in the receptacle body and eject the receptacle body from the holder as the follower rides off from one terminal onto the other terminal of the rail, and telescoping members enclosing said rod and spring, one of said members being fixed and the other participating in the movement of the rod.

31. In receptacle making apparatus, a rotatable table, a hollow holder for a receptacle body of greater length than the holder mounted on the table to extend radially thereof, means to rotate the table and successively position the holder with the outer end of the holder relative to means disposed about the table to engage a closure disk in the outer end of the receptacle body in the holder and to means to secure the closure disk in the receptacle body, a member mounted on the table at the inner end of the holder to have movement toward and away from the holder, means relative to which said member is moved by the rotation of the table and position said member in spaced relation to said holder to engage a receptacle body in the holder during the engaging and securing of the closure disk in the receptacle body and move said member toward the holder to loosen and move the receptacle body longitudinally toward the outer end of the holder subsequent to the securing of the closure disk in the receptacle body, an ejector carried by said member and extended into the holder through the inner end thereof, a spring normally urging said ejector in a direction into and adapted to move the ejector through the outer end of the holder, a cam disposed about the axis of rotation of the table, and means carried by the ejector adapted to follow said cam through the influence of the spring and permit of movement of the ejector by the spring to engage the ejector with the closure disk secured in the receptacle body and eject the receptacle from the holder.

32. In apparatus for making receptacles, a rotatable table, a holder to support a receptacle body of greater length than the holder with the ends thereof projecting from the opposite ends of the holder, said holder being mounted on the table to extend radially thereof, means to rotate the table and position the outer end of the holder relative to means to engage a closure disk in the end of the receptacle body projecting from the holder and to means to secure the closure disk in the receptacle body, a member movably mounted on the table to have movement toward and away from the inner end of the holder, means extending about the axis of the table engaged by and relative to which said movably mounted member is moved by the rotation of the table and said means arranged relative to the means to engage and secure the closure disk in the receptacle body to position the movably mounted member in spaced relation to the inner end of the holder to engage the inner projecting end of and hold the receptacle body against movement in the holder during the engaging and securing of the closure disk in the receptacle body and a portion of said means relative to which said member is moved successively to positioning the holder relative to the closure disk securing means to actuate said member toward the holder and move the receptacle body longitudinally outward from the holder, ejector means carried by the movably mounted member and yieldingly urged in a direction toward the outer end of the holder, and means extending about the axis of the table engaged and followed by the ejector means in the rotation of the table arranged to normally maintain the ejector means within the outer end of the holder and permit of yielding movement of the ejector means toward the outer holder end and eject the receptacle body from the holder.

33. In apparatus for making receptacles, a rotatable table, a hollow holder for a receptacle body mounted on the table to extend radially thereof, means to intermittently rotate the table and position an end of the holder to receive a receptacle body, relative to means to engage a closure disk in one end of the receptacle body carried by the holder, to means to secure the closure disk in the receptacle body, and to a station where the receptacle body with the closure disk secured therein is ejected from the holder, a fixed cam having a portion extending concentric to the axis of the table relative to the means to engage and secure the closure disk in the receptacle body and a portion eccentric to the axis of the table extending relative to the ejecting station, means mounted on the table to have movement toward and away from the end of the holder opposite the end positioned relative to the closure disk engaging and securing means and arranged with means to follow the cam, a fixed cam rail arranged concentric to the axis of the table and having terminal portions spaced from each other radially of the axis of the table intermediate the ends of the eccentric portion of the first cam, an ejector rod carried by the movably mounted means within the holder to have longitudinal movement independently of said movably mounted means inwardly and outwardly of the holder and arranged with means to follow the rail, and means to yieldingly urge said rod in a direction outwardly of the holder, the concentric portion of the cam positioning the movably mounted member to engage and hold the receptacle body against movement in the holder and the eccentric portion of said cam actuating the movable member toward the holder to move the receptacle body longitudinally and outwardly of the holder, and the cam rail normally positioning the ejector rod within the holder and the spaced terminal portions of said rail permitting of movement of the ejector rod by the yielding means outwardly of the holder into engagement with the closure disk and eject the receptacle body from the holder.

34. Apparatus for making receptacles as claimed in claim 33, wherein the eccentric portion of the cam is arranged to actuate the movably mounted means gradually toward the holder prior to the engaging of the closure disk by the ejector rod.

35. Apparatus for making receptacles as claimed in claim 33, wherein the end of the holder opposite the end positioned relative to the means to engage and secure the closure disk in the receptacle body is of elliptical shape extending obliquely to the horizontal axis of the holder, and the movably mounted means is arranged to conform to the shape and position of the elliptical end of the holder.

36. Apparatus for making receptacles as claimed in claim 33, wherein the cam comprises a channel in a disk mounted concentrically above the table, and the cam rail a vertical wall of a disk mounted on a hub portion of and above the first disk.

37. In apparatus for making receptacles, an annular rotatably supported table, a series of hollow holders for receptacle bodies fixed on the table to extend radially thereof, means to intermittently rotate the table to successively position the outer end of the holders to position to engage receptacle bodies in the holders, relative to means to engage a closure disk in the end of a receptacle body in a holder and to means to secure said closure disks in the receptacle bodies, means mounted on the table relative to each holder to have sliding movement toward and away from the inner end of the holders, a cam fixed relative to the rotation of the table, rollers carried by the slidable means to follow the cam and the cam arranged to position said means in spaced relation to the holders as the holders are positioned to receive a receptacle body and relative to the closure disk engaging and securing means and actuate said means toward the holders after the closure disk is secured in the receptacle body to move the receptacle body outwardly of the holder, an ejector rod having a head longitudinally reciprocatory in each holder, springs normally urging the ejector rods outwardly of the holder, a second cam fixed relative to the rotation of the table, rollers carried by the ejector rods urged into engagement with and to follow said latter cam by the springs normally positioning the rod heads within the holders and permit the rods to be moved by the springs in successive sequence with the actuation of the slidable means toward the holders to engage the heads with the disk secured in and eject the receptacles from the holders.

38. The method of making receptacles, which comprises providing a blank, shaping the blank to tubular and circular form in cross section and securing the blank at the longitudinal marginal portions to form a receptacle body, positioning opposite wall portions at one end of the body toward each other to provide an elongated and transversely restricted opening at said end of the body, holding the body at the exterior wall in said condition and engaging a flanged disk into the end of the body opposite the restricted end with the flange extending outwardly contiguous to the wall of the body and simultaneously with the engaging of the disk in the body arranging the body with an annular shoulder and seating the disk against said shoulder to constitute the bottom of the receptacle, and then interlocking the disk flange and contiguous end portion of the body to secure the disk in the body seated against the annular shoulder and forming a receptacle with opposite side wall portions tapering from the bottom to the end with the restricted opening.

39. The method of making receptacles, which comprises providing a cylindrical body of pliable material and a closure disk of relatively stiff material, positioning opposite wall portions at one end of the body toward each other to elongate and transversely restrict the opening at said end of the body and maintaining the opposite end of circular form, and engaging and securing the closure disk in the end of the body opposite the restricted end while holding the body exteriorly thereof to form a receptacle having an elongated and transversely restricted open end.

40. In apparatus for making receptacles including a tubular body having a bottom closure in one end and the opposite end adapted to be closed by pressing together opposite wall portions, a tubular holder having a bore of circular form at one end and of elliptical form at the opposite end with opposite wall portions of the holder bore converging from within the circular end to the elliptical end adapted to receive a tubular receptacle body engaged into the circular end of the holder bore and shape the body to conform to the shape of the holder bore.

41. In means for forming and bottoming receptacle bodies of pliable material and truncated conical form, a hollow holder having a bore of circular form at one end and of elliptical form at the opposite end of a length substantially equal to the diameter of the circular end with opposite wall portions of the holder bore converging from within the circular end to the elliptical end of the holder bore and adapted to receive a conical receptacle body engaged longitudinally into the circular end of the holder bore with the end of the body of smaller diameter foremost and thereby shape the body to conform to the shape of the holder bore, the holder being of a length and arranged whereby when the body is engaged therein the end of larger diameter of the body will project from the circular end of the holder.

42. In apparatus for making receptacles including a tubular body having a bottom closure disk in one end and the opposite end adapted to be closed by pressing together opposite wall portions, a tubular holder having a bore of circular form at one end and of elliptical form at the opposite end with opposite wall portions of the holder bore converging from within the circular end to the elliptical end and adapted to receive a tubular receptacle body engaged into the circular end of the holder and shaping the body to conform to the shape of the holder bore, the holder being of a length and arranged so that an end portion of a receptable body engaged therein will project from the holder, a plunger adapted to receive a flanged bottom disk and engage said disk into the projecting end of a receptacle body in the holder, and means to interlock the projecting end of the body with the disk flange engaged therein in the holder to secure the disk in the body.

HAROLD S. BUCKINGHAM.